(12) United States Patent
Clapper et al.

(10) Patent No.: US 9,732,173 B2
(45) Date of Patent: Aug. 15, 2017

(54) COMPOSITIONS COMPRISING CLEAVABLE CROSSLINKER AND METHODS

(71) Applicant: 3M INNOVATIVE PROPERTIES COMPANY, St. Paul, MN (US)

(72) Inventors: Jason D. Clapper, Lino Lakes, MN (US); Dennis E. Vogel, Lake Elmo, MN (US); Ann Rhea-Helene Fornof, Austin, TX (US); Babu N. Gaddam, Woodbury, MN (US)

(73) Assignee: 3M Innovative Properties Co., St. Paul, MN (US)

( * ) Notice: Subject to any disclaimer, the term of this patent is extended or adjusted under 35 U.S.C. 154(b) by 0 days.

(21) Appl. No.: 15/119,887

(22) PCT Filed: Apr. 9, 2015

(86) PCT No.: PCT/US2015/025080
§ 371 (c)(1),
(2) Date: Aug. 18, 2016

(87) PCT Pub. No.: WO2015/164087
PCT Pub. Date: Oct. 29, 2015

(65) Prior Publication Data
US 2017/0066863 A1   Mar. 9, 2017

Related U.S. Application Data

(60) Provisional application No. 61/983,532, filed on Apr. 24, 2014.

(51) Int. Cl.
| | | |
|---|---|---|
| C09J 4/00 | (2006.01) |
| C09J 5/06 | (2006.01) |
| C09J 7/02 | (2006.01) |
| C09J 133/06 | (2006.01) |
| C09J 133/08 | (2006.01) |
| C09J 133/10 | (2006.01) |
| C08F 220/18 | (2006.01) |
| C08J 3/28 | (2006.01) |
| C09J 5/00 | (2006.01) |
| C08F 222/10 | (2006.01) |

(52) U.S. Cl.
CPC .............. *C08F 220/18* (2013.01); *C08J 3/28* (2013.01); *C09J 4/00* (2013.01); *C09J 5/00* (2013.01); *C09J 5/06* (2013.01); *C09J 7/0217* (2013.01); *C09J 133/08* (2013.01); *C08F 222/1006* (2013.01); *C08F 2220/1858* (2013.01); *C08F 2800/20* (2013.01); *C08F 2810/10* (2013.01); *C08J 2333/08* (2013.01); *C09J 133/062* (2013.01); *C09J 133/10* (2013.01); *C09J 2205/302* (2013.01)

(58) Field of Classification Search
CPC .......... C09J 133/062; C09J 2205/302
USPC .................... 428/355 AC; 522/121
See application file for complete search history.

(56) References Cited

U.S. PATENT DOCUMENTS

| | | |
|---|---|---|
| 3,708,296 A | 1/1973 | Schlesinger |
| 4,069,055 A | 1/1978 | Crivello |
| 4,216,288 A | 8/1980 | Crivello |
| 4,250,311 A | 2/1981 | Crivello |
| 4,330,590 A | 5/1982 | Vesley |
| 5,084,586 A | 1/1992 | Farooq |
| 5,097,010 A | 3/1992 | Markle |
| 5,124,417 A | 6/1992 | Farooq |
| 5,387,450 A | 2/1995 | Stewart |
| 5,506,279 A | 4/1996 | Babu |
| 5,554,664 A | 9/1996 | Lamanna |

(Continued)

FOREIGN PATENT DOCUMENTS

WO   WO 96-04346   2/1996

OTHER PUBLICATIONS

Polymer Products from Aldrich, Reference: Polymer Properties, Thermal Transitions of Homopolymers: Glass Transition & Melting Point, pp. 52-53. Greene, et al. "Greene's Protective Groups in Organic Synthesis," Fourth Edition, Protection for the Carbonyl Group, Acetals and Ketals, pp. 431-448, 2007.
"Degradable Polymer Networks and Star Polymers Based on Mixtures of Two Cleavable Dimethacrylate Crosslinkers:Synthesis, Characterization", and Degradation, Patriokios, C.S. et al., J. Poly Sci. A ,(2009), vol. 47, 5853-5870.
"Design of Reversible Cross-Linkers for Step and Flash Imprint Lithography Imprint Resists", Wilson, C.G. et al., ACS Nano, (2007), vol. 1, No. 4, 307-312.

*Primary Examiner* — Ramsey Zacharia
(74) *Attorney, Agent, or Firm* — Carolyn A. Fischer

(57) ABSTRACT

A composition is described comprising a polymer. The polymer comprises polymerized units derived from a cleavable crosslinking monomer. The cleavable crosslinking monomer comprises at least two free-radically polymerizable groups and at least one group having the formula —O—C($R_2$)($R_3$)—O—, wherein $R_2$ and $R_3$ are independently hydrogen, alkyl, or aryl. The composition has a Tg no greater than 50° C. In some embodiments, the composition has a storage modulus greater than $3 \times 10^5$ Pa at 25° C. and 1 Hz and may be characterized as a non-tacky polymer. In other embodiments, the composition is a pressure sensitive adhesive. Upon cleavage of at least a portion of the polymerized monomeric units derived from the cleavable crosslinking monomer, the composition exhibits a change in at least one physical property. In another embodiment, the composition comprises a polymer and fragments. The fragments comprise the reaction product of a free-radically polymerizable group bonded to a polymer chain and a pendent hydroxyl group. The composition has a Tg no greater than 50° C. Also described are articles, comprising the composition described herein (i.e. before and/or after cleavage); as well as methods of making the composition and methods of making articles.

31 Claims, No Drawings

(56) References Cited

U.S. PATENT DOCUMENTS

| | | | |
|---|---|---|---|
| 5,872,158 | A | 2/1999 | Kuczynski |
| 5,902,836 | A | 5/1999 | Bennett |
| 5,976,690 | A | 11/1999 | Williams |
| 6,627,384 | B1 | 9/2003 | Kim |
| 6,652,970 | B1 | 11/2003 | Everaerts |
| 7,514,202 | B2 | 4/2009 | Ohsawa |
| 2009/0145758 | A1 | 6/2009 | Kwon |
| 2010/0022709 | A1 | 1/2010 | Jin |
| 2012/0288692 | A1 | 11/2012 | Broyles |
| 2013/0303654 | A1 | 11/2013 | Salamone |

COMPOSITIONS COMPRISING CLEAVABLE CROSSLINKER AND METHODS

SUMMARY

In one embodiment, a composition is described comprising a polymer. The polymer comprises polymerized units derived from a cleavable crosslinking monomer. The cleavable crosslinking monomer comprises at least two free-radically polymerizable groups and at least one group having the formula —O—C($R_2$)($R_3$)—O—, wherein $R_2$ and $R_3$ are independently hydrogen, alkyl, or aryl. The composition has a Tg no greater than 50° C.

In some embodiments, the composition has a storage modulus greater than $3 \times 10^5$ Pa at 25° C. and 1 Hz and may be characterized as a non-tacky polymer. In other embodiments, the composition is a pressure sensitive adhesive.

Upon cleavage of at least a portion of the polymerized monomeric units derived from the cleavable crosslinking monomer, the composition exhibits a change in at least one physical property. For example, the composition may exhibit a decrease in polymer gel content, a decrease in storage modulus, or an increase in peel adhesion.

In another embodiment, the composition comprises a polymer and fragments. The fragments comprise the reaction product of a free-radically polymerizable group bonded to a polymer chain and a pendent hydroxyl group. The composition has a Tg no greater than 50° C.

Also described are articles, comprising the composition described herein (i.e. before and/or after cleavage); as well as methods of making the composition and methods of making articles.

In one embodiment, the composition is syrup comprising i) a free-radically polymerizable solvent monomer; and ii) a solute (meth)acrylic polymer comprising polymerized units derived from one or more alkyl (meth)acrylate monomer(s) having a Tg no greater than 10° C.; wherein the syrup comprises at least one cleavable crosslinking monomer or the (meth)acrylic solute polymer comprises polymerized units derived from at least one cleavable crosslinking monomer at least two free radically polymerizable groups and at least one group having the formula —O—C($R^2$)($R^3$)—O—, wherein $R_2$ and $R_3$ are independently hydrogen, alkyl, or aryl.

DETAILED DESCRIPTION

"Syrup composition" refers to a solution of a solute polymer in one or more solvent monomers, the composition having a typical viscosity from 100 to 8,000 cPs at 25° C. The syrup has a viscosity greater than the solvent monomer(s).

The term "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, 2-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

The term heteroalkyl refers to an alkyl group, as just defined, having at least one catenary carbon atom (i.e. in-chain) replaced by a catenary heteroatom such as O, S, or N.

The term "aryl" refers to a substituent derived from an aromatic ring and includes both unsubstituted and substituted aryl groups. Examples of "aryl" include phenyl, halogenated pheny, and the like.

When a group is present more than once in a formula described herein, each group is "independently" selected unless specified otherwise.

Presently described are compositions comprising a polymer. The polymer comprises polymerized units derived from a cleavable crosslinking monomer.

Cleavable crosslinkers, also referred to as a degradable crosslinkers, are generally crosslinkers that are capable of copolymerizing with other free-radically polymerizable monomers to form a crosslinked polymeric network. Unlike conventional crosslinkers, cleavable crosslinkers are also capable of cleaving into separate fragments at the location of a covalent bond. Such cleavage, also described herein as activation, is generally achieved by exposing the crosslinked composition to an energy source such as heat and/or (e.g. ultraviolet) actinic radiation.

The composition described herein comprise polymerized units derived from a cleavable crosslinking monomer comprising at least two free-radically polymerizable groups and at least one group having the formula —O—C($R_2$)($R_3$)—O— wherein $R_2$ and $R_3$ are independently hydrogen, (e.g. $C_1$-$C_6$) alkyl, and aryl. The alkyl and aryl groups may optionally comprise substituents. The alkyl group may be linear or branched such as in the case of methyl, ethyl, propyl, butyl, or hexyl. In typical embodiments, at least one of or both of $R_2$ and $R_3$ are independently hydrogen or methyl.

The free-radically polymerizable groups are generally copolymerized with other monomers during the polymerization of the (meth)acrylic polymer, thereby incorporating polymerized units derived from the cleavable monomer into the backbone of the (meth)acrylic polymer. The free-radically polymerizable groups are ethylenically unsaturated terminal polymerizable groups including (meth)acryl such as (meth)acrylamide ($H_2C$=CHCON— and $H_2C$=CH($CH_3$)CON—) and (meth)acrylate($CH_2$CHCOO— and $CH_2C(CH_3)$COO—). When at least 50 wt-% of the free-radically polymerizable groups are (meth)acrylate groups, the polymer may be characterized as a (meth)acrylic polymer. Other ethylenically unsaturated polymerizable groups include vinyl ($H_2C$=C—) including vinyl ethers ($H_2C$=CHOCH—).

In some embodiments, the cleavable crosslinking monomer has a single —O—C($R_2$)($R_3$)—O—. In such embodiment, the cleavable crosslinking monomer typically has the formula:

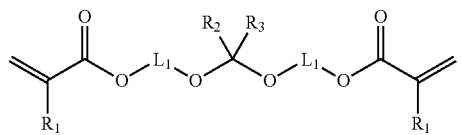

wherein
$R_1$ is hydrogen or methyl;
$R_2$ and $R_3$ are independently hydrogen, (e.g. $C_1$-$C_6$) alkyl, or aryl; and
$L_1$ is a divalent linking group.

The alkyl and aryl group may optionally comprise substituents. The divalent linking group, $L_1$, typically has a molecular weight no greater than 500, 250, 100, 75 or 50 g/mole. In some embodiments, the divalent linking group, $L_1$, is a (e.g. $C_1$-$C_6$) alkylene group. In some embodiments, $L_1$ is a $C_2$ or $C_3$ alkylene group.

In other embodiments, the cleavable crosslinking monomer has two —O—C($R_2$)($R_3$)—O— groups. In such embodiment, the cleavable crosslinking monomer typically has the formula:

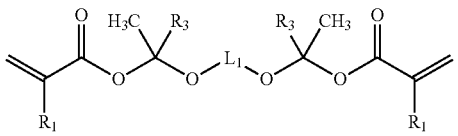

wherein $R_1$, $R_3$ and $L_1$ are the same as previously described.

The cleavable group may be characterized as an acetal or ketal group. Representative cleavable crosslinking monomers include for example 2,2-di(2-acryloxyethoxy)propane); (butane-1,4-diylbis(oxy))bis(ethane-1,1-diyl)diacrylate); bis (2-hydroxethyl methacrylate) acetal; bis (2-hydroxyethyl acrylate)acetal; acetone bis (2-hydroxypropyl methacrylate) ketal; and acetone bis (2-hydroxypropyl acrylate)ketal. Other cleavable crosslinking monomer can be synthesized.

The concentration of cleavable (e.g. acetal or ketal) crosslinking monomer is at least 0.05, 0.1, 0.2 wt. % and can generally range up to 50 wt. % of the composition. When the composition is free of non-polymerized components such as tackifier, plasticizer, and/or filler; the concentrations described herein are also equivalent to the concentration of such polymerized units in the (meth)acrylic polymer. In typical embodiments the concentration of cleavable (e.g. acetal or ketal) crosslinking monomer is at least 0.5 or 1 or 2 or 3 or 4 or 5 wt. % of the composition. As the concentration of such crosslinking monomer increases, the peel adhesion (180° to stainless steel) prior to cleavage can decrease. Thus, especially for embodiments wherein the composition is a PSA prior to cleavage the concentration of cleavable crosslinking monomer is typically no greater than 25 or 20 or 15 wt. % of the composition. The composition may comprise a single cleavable crosslinking monomer or a combination of two or more of such cleavable crosslinking monomers. When the composition comprises a combination of cleavable crosslinking monomers, the total concentration generally falls within the ranges just described.

The polymer and/or PSA composition is a copolymer of at least one cleavable crosslinking monomer and at least one other (non-cleavable) monomer. The Tg of the copolymer may be estimated by use of the Fox equation, based on the Tgs of the constituent monomers and the weight percent thereof. The polymer and/or PSA composition has a Tg no greater than 50° C.

In some embodiments, the polymer is a (meth)acrylic polymer and/or PSA comprising polymerized units derived from one or more (meth)acrylate ester monomers derived from a (e.g. non-tertiary) alcohol containing from 1 to 14 carbon atoms and preferably an average of from 4 to 12 carbon atoms. The (meth)acrylic polymer and/or PSA composition may also comprise one or more monomers (e.g. common to acrylic polymers and adhesives) such as a (meth)acrylic ester monomers (also referred to as (meth) acrylate acid ester monomers and alkyl(meth)acrylate monomers) optionally in combination with one or more other monomers such as acid-functional ethylenically unsaturated monomers, non-acid-functional polar monomers, and vinyl monomers.

Examples of monomers include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isoctylalcohol, 2-ethyl-1-hexanol, 1-decanol, 2-propyl-heptanol, 1-dodecanol, 1-tridecanol, 1-tetradecanol, and the like. In some embodiments, a preferred (meth)acrylate ester monomer is the ester of (meth)acrylic acid with isooctyl alcohol.

The polymer and/or PSA composition comprises one or more low Tg monomers, having a Tg no greater than 10° C. when the monomer is polymerized (i.e. independently) to form a homopolymer. In some embodiments, the low Tg monomers have a Tg no greater than 0° C., no greater than −5° C., or no greater than −10° C. when reacted to form a homopolymer. The $T_g$ of these homopolymers is often greater than or equal to −80° C., greater than or equal to −70° C., greater than or equal to −60° C., or greater than or equal to −50° C. The Tg of these homopolymers can be, for example, in the range of −80° C. to 20° C., −70° C. to 10° C., −60° C. to 0° C., or −60° C. to −10° C.

The low Tg monomer may have the formula

$H_2C=CR_1C(O)OR^8$ wherein $R_1$ is H or methyl and $R^8$ is an alkyl with 1 to 22 carbons or a heteroalkyl with 2 to 20 carbons and 1 to 6 heteroatoms selected from oxygen or sulfur. The alkyl or heteroalkyl group can be linear, branched, cyclic, or a combination thereof.

Exemplary low Tg monomers include for example ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate, isononyl acrylate, decyl acrylate, isodecyl acrylate, lauryl acrylate, isotridecyl acrylate, octadecyl acrylate, and dodecyl acrylate.

Low Tg heteroalkyl acrylate monomers include, for example, 2-methoxyethyl acrylate and 2-ethoxyethyl acrylate.

In some embodiments, the polymer and/or PSA composition comprises at least one low Tg monomer having a non-cyclic alkyl (meth)acrylate monomer(s) having 4 to 20 carbon atoms. In some embodiments, the (meth)acrylic polymer and/or PSA comprises at least one low Tg monomer having a (e.g. branched) alkyl group with 6 to 20 carbon atoms. In some embodiments, the low Tg monomer has a (e.g. branched) alkyl group with 7 or 8 carbon atoms. Exemplary monomers include, but are not limited to, 2-ethylhexyl (meth)acrylate, isooctyl (meth)acrylate, n-octyl (meth)acrylate, 2-octyl (meth)acrylate, isodecyl (meth)acrylate, and lauryl (meth)acrylate.

In some embodiments, the (e.g. low Tg) monomer is the ester of (meth)acrylic acid with an alcohol derived from a renewable source. A suitable technique for determining whether a material is derived from a renewable resource is through $^{14}C$ analysis according to ASTM D6866-10, as described in US2012/0288692. The application of ASTM D6866-10 to derive a "bio-based content" is built on the same concepts as radiocarbon dating, but without use of the age equations. The analysis is performed by deriving a ratio of the amount of organic radiocarbon ($^{14}C$) in an unknown sample to that of a modern reference standard. The ratio is reported as a percentage with the units "pMC" (percent modern carbon).

One suitable monomer derived from a renewable source is 2-octyl(meth)acrylate, as can be prepared by conventional techniques from 2-octanol and (meth)acryloyl derivatives such as esters, acids and acyl halides. The 2-octanol may be prepared by treatment of ricinoleic acid, derived from castor oil, (or ester or acyl halide thereof) with sodium hydroxide, followed by distillation from the co-product sebacic acid. Other (meth)acrylate ester monomers that can be renewable are those derived from ethanol, 2-methyl butanol and dihydrocitronellol.

In some embodiments, the (meth)acrylic polymer and/or PSA composition comprises a bio-based content of at least 25, 30, 35, 40, 45, or 50 wt. % using ASTM D6866-10, method B. In other embodiments, the (e.g. pressure sensitive) adhesive composition comprises a bio-based content of at least 55, 60, 65, 70, 75, or 80 wt. %. In yet other embodiments, the composition comprises a bio-based content of at least 85, 90, 95, 96, 97, 99 or 99 wt. %.

In some embodiments, the polymer and/or PSA composition comprises a high Tg monomer, having a Tg greater than 10° C. and typically of at least 15° C., 20° C. or 25° C., and preferably at least 50° C. Suitable high Tg alkyl (meth)acrylate monomers include, for example, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate (110° C., according to Aldrich), norbornyl (meth)acrylate, benzyl methacrylate, 3,3,5 trimethylcyclohexyl acrylate, cyclohexyl acrylate, N-octyl acrylamide, and propyl methacrylate or combinations.

The alkyl (meth)acrylate monomers are typically present in the (meth)acrylic polymer in an amount of at least 50, 55, 60, 65, or 75 wt. % of the composition.

In some embodiments, the PSA composition comprises at least 50, 55, 60, 65, 70, 75, 80, 85, 90 or 95 wt. % or greater of low Tg (e.g. alkyl) (meth)acrylate monomer(s). When high Tg monomers are included in a pressure sensitive adhesive, the adhesive may include at least 5, 10, 15, 20, to 30 parts by weight of such high Tg (e.g. alkyl) (meth)acrylate monomer(s).

The (meth)acrylic polymer may alternatively comprise less low Tg alkyl (meth)acrylate monomer(s). For example, the (meth)acrylic polymer may comprise at least 25, 30, 35, 40, or 45 wt. % of low Tg alkyl (meth)acrylate monomer in combination with high Tg alkyl (meth)acrylate monomer(s) such that the total alkyl(meth)acrylate monomer is at least 50, 55, 60, 65, or 75 wt. %.

The (meth)acrylic polymer and/or PSA composition may optionally comprise an acid functional monomer (a subset of high Tg monomers), where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. The acid functional monomer is generally used in amounts of 0.5 to 15 parts by weight, preferably 0.5 to 10 parts by weight, based on 100 parts by weight total monomer.

The (meth)acrylic polymer and/or PSA composition may optionally comprise other monomers such as a non-acid-functional polar monomer.

Representative examples of suitable polar monomers include but are not limited to 2-hydroxyethyl (meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl) (meth)acrylates including 2-(2-ethoxyethoxy)ethyl (meth)acrylate, 2-ethoxyethyl (meth)acrylate, 2-methoxyethoxyethyl (meth)acrylate, 2-methoxyethyl methacrylate, polyethylene glycol mono (meth)acrylates; alkyl vinyl ethers, including vinyl methyl ether; and mixtures thereof. Preferred polar monomers include those selected from the group consisting of 2-hydroxyethyl (meth)acrylate and N-vinylpyrrolidinone. The non-acid-functional polar monomer may be present in amounts of 0 to 10, 15 or 20 parts by weight, or 0.5 to 5 parts by weight, based on 100 parts by weight total monomer.

When used, vinyl monomers useful in the (meth)acrylate polymer include vinyl esters (e.g., vinyl acetate and vinyl propionate), styrene, substituted styrene (e.g., α-methyl styrene), vinyl halide, and mixtures thereof. As used herein vinyl monomers are exclusive of acid functional monomers, acrylate ester monomers and polar monomers. Such vinyl monomers are generally used at 0 to 5 parts by weight, preferably 1 to 5 parts by weight, based on 100 parts by weight total monomer.

The composition, comprising polymerized units derived from the described cleavable crosslinking monomer, is generally stable until activation, meaning that the cleavable crosslinking monomer remains essentially crosslinked and unfragmented until activation. The shelf life of the composition at typical storage conditions, ranging from room temperature to 120° F. (25° C. to 49° C.) and 50% relative humidity, is generally sufficient to permit the intended use of the composition. The shelf life is typically at least about one month, about six months, or about one year.

Activation of the cleavable crosslinker occurs by application of an external energy source such as heat, (e.g. ultraviolet) actinic radiation, or a combination thereof as will subsequently be described.

Once activated, the (meth)acrylic polymer comprises fragments. The fragment comprises the reaction product of a free-radically polymerizable (e.g. (meth)acrylate)) group bonded to a (meth)acrylic polymer chain and a pendent hydroxyl group. The fragments that form during activation of the cleavable monomer lack free radicals and can also lack ethylenic unsaturation. Thus, the fragments lack functionality to react with each other. Further, the fragments lack functionality to react with any other polymerized units of the (meth)acrylic polymer or any other components present in the composition. Therefore, compositions containing the fragments of the cleavable crosslinker (i.e. cleaved crosslinker) are relatively stable. Further, the sum of the molecular weights of the total fragments is essentially the same as the molecular weight of the composition prior to fragmentation.

Due to the inclusion of a sufficient amount of low Tg (e.g. alkyl (meth)acrylate) monomer and/or other additives such as plasticizer and tackifier compositions described herein have a glass transition temperature "Tg" of no greater than 50° C. prior to activation of the cleavable crosslinking monomer. As used herein, Tg refers to the value obtained utilizing dynamic mechanical analysis according to the test method described in the examples. In some embodiments, the compositions have a Tg no greater than 45° C., 40° C., 35° C., 30° C., 25° C., or 20° C. prior to activation of the cleavable crosslinking monomer. In some embodiments, the compositions have a Tg no greater than 15° C., 10° C., 5° C., 0° C., or −0.5° C. prior to activation of the cleavable crosslinking monomer. In some embodiments, the compositions can exhibit a lower Tg after activation of the cleavable crosslinking monomer. The decrease in Tg may have an absolute value of at least 0.5 or 1.0. In some embodiments, the decrease in Tg may have an absolute value of at least 2° C., 3° C., 4° C., 5° C., 6° C., 7° C., 8° C. or greater. In some embodiments, the decrease in Tg is no greater than about 10° C.

In some embodiments, the composition is a pressure sensitive adhesive prior to and after activation of the cleavable crosslinking monomer. In this embodiment, the storage modulus (G') of the pressure sensitive adhesive at the application temperature, typically room temperature (e.g. 25° C.), is less than $3\times10^5$ Pa at a frequency of 1 Hz. As used herein, storage modulus (G') refers to the value obtained utilizing dynamic mechanical analysis according to the test method described in the examples. In some embodiments, the composition has a storage modulus of less than $2\times10^5$ Pa, $1\times10^5$ Pa, $9\times10^4$ Pa, $8\times10^4$ Pa, $7\times10^4$ Pa, $6\times10^4$ Pa, $5\times10^4$ Pa, $4\times10^4$ Pa, or $3\times10^4$ Pa, prior to activation of the cleavable crosslinking monomer. In some embodiments, the composition has a storage modulus (G') of less than $2.0\times10^4$ Pa or $2.5\times10^4$ Pa after activation of the cleavable crosslinking monomer.

In other embodiments, the composition is a non-tacky polymeric film and not a pressure sensitive adhesive prior to activation of the cleavable crosslinking monomer; yet the composition is a pressure sensitive adhesive after activation of the cleavable crosslinking monomer. In this embodiment, the storage modulus of the pressure sensitive adhesive at the application temperature (e.g. 25° C.) is greater than or equal to $3\times10^5$ Pa at a frequency of 1 hertz (Hz) prior to cleavage of the cleavable crosslinking monomer; yet less than $3\times10^5$ Pa at a frequency of 1 Hz at the application temperature, (e.g. 25° C.) after cleavage of the crosslinking monomer.

In yet other embodiments, the composition is a non-tacky film and not a pressure sensitive adhesive both prior to and after cleavage of the cleavable crosslinking monomer. In this embodiment, the storage modulus at the application temperature (e.g. 25° C.) is greater than or equal to $3\times10^5$ Pa at 1 Hz before and after activation.

Upon cleavage of at least a portion of the polymerized monomeric units derived from the cleavable crosslinking monomer, the composition exhibits a change in at least one physical property such as gel content, storage modulus, adhesive properties such as peel adhesion, as well as tensile properties such as peak force at break and strain at break.

In some embodiments, the gel content of the polymer, decreases upon cleavage of at least a portion of the polymerized monomeric units derived from the cleavable crosslinking monomer. In some embodiments, the gel content, as measured according to the test method described in the examples, is typically at least 90%, 95 or 100% prior to activation of the cleavable crosslinking monomer. The decrease in gel content, defined as the (gel content before activation—gel content after activation) is typically at least 5, 10 or 15%. For many embodiments, it is desirable that the composition has sufficient cohesive strength after activation. In this embodiment, it is desirable to select the concentration of cleavable crosslinker and the activation conditions such that the gel content of the polymer is at least 80% or 90% after activation. In other embodiments, such as temporary bonding applications the decrease in gel content of the polymer can be 50, 60, 70, or 80% or greater.

In some embodiments, the storage modulus at application temperature (e.g. 25° C.) and 1 Hz decreases upon cleavage of at least a portion of the polymerized monomeric units derived from the cleavable crosslinking monomer. In some embodiments, the storage modulus decreases by at least 1,000; 2,000; 3,000; 4,000; or 5,000 Pa. Relatively small decreases in modulus are useful, for example, to slightly adjust (e.g. increase) the adhesion properties of a PSA. In some embodiments, the storage modulus decreases by at least 10,000; 20,000; 30,000; 40,000; 50,000; or 60,000 Pa. In yet other embodiments, the storage modulus decreases by at least 75,000; 100,000; or 150,000 Pa. Greater decreases in modulus are useful, for example, for significantly adjusting (e.g. increasing) adhesion. In yet other embodiments, the storage modulus decreases by at least 100,000; 150,000; 200,000; 250,000; 300,000; 350,000; 400,000; 450,000; 500,000; 550,000 or 600,000 Pa. Even greater decreases in modulus are useful, for example, when an initially non-tacky film is rendered a PSA upon cleavage of the crosslinking monomer. The change in storage modulus, defined as the (storage modulus before activation—storage modulus after activation)/storage modulus before activation×100%, can be at least 5, 10, 15, or 20% and may range up to 50, 60, 70% or greater.

In some embodiments, the peel adhesion (e.g. to stainless steel or glass), as measured according to the test method described in the examples, increases upon cleavage of at least a portion of the polymerized monomeric units derived from the cleavable crosslinking monomer. In some embodiments, the increase in peel adhesion, defined as the (peel adhesion before activation—peel adhesion after activation) can be at least 1, 2, 3, 4, or 5 N/dm ranging up to for example 15, 16, 17, 18, 19, or 20 N/dm.

In some embodiments, the PSA composition exhibits high shear values (to stainless steel), i.e. greater than 10,000 minutes at 70° C. after activation of the cleavable crosslinker. Notably the PSA exhibits comparable wet out properties as conventional crosslinkers prior to activation, e.g. a wet out, as measured according to the test method described in the examples, of less than 5, 4, 3, or 2 sec/in$^2$.

In yet other embodiments, the tensile properties as measured according to the test method described in the examples, change upon cleavage of at least a portion of the polymerized monomeric units derived from the cleavable crosslinking monomer. For example, the peak force at break can decrease. In some embodiments, the decrease in peak force, defined as the (peak force before activation—peak force after activation) can be at least 100, 200, 300, 400, 500, 600 g or greater. In some embodiments, the strain at break defined as the (strain at break before activation—stain at break after activation) can be at least 50, 75 or 100% or greater. In some embodiments, the strain at break after activation is at least 150%, 200%, or 250%, or greater; which is indicative of improved flexibility.

The (meth)acrylic polymer and/or PSA may optionally comprise at least one other crosslinker, that is not a cleavable crosslinker, in addition to the cleavable crosslinker. Thus, the crosslinks (or crosslinked network) formed by the non-cleavable crosslinker are not fragmented upon activation of the cleavable crosslinker.

In some embodiments, the (e.g. pressure sensitive) adhesive comprises a non-cleavable multifunctional (meth)acrylate crosslinking monomer. Examples of useful multifunctional (meth)acrylate include, but are not limited to, di(meth)acrylates, tri(meth)acrylates, and tetra(meth)acrylates, such as 1,6-hexanediol di(meth)acrylate, poly(ethylene glycol) di(meth)acrylates, polybutadiene di(meth)acrylate, polyurethane di(meth)acrylates, and propoxylated glycerin tri(meth)acrylate, and mixtures thereof.

Generally the multifunctional (meth)acrylate is not part of the original monomer mixture, but added subsequently to the syrup after the formation of the (meth)acrylic polymer. When utilized, the multifunctional (meth)acrylate is typically used in an amount of at least 0.05, 0.10, 0.15, 0.20 up to 1, 2, 3, 4, or 5 parts by weight, relative to 100 parts by weight of the total monomer content.

In other embodiments, (meth)acrylic polymer and/or PSA may further comprise a non-cleavable chlorinated triazine crosslinking compound. The triazine crosslinking agent may have the formula.

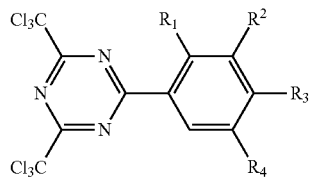

wherein $R_1$, $R_2$, $R_3$ and $R_4$ of this triazine crosslinking agent are independently hydrogen or alkoxy group, and 1 to 3 of $R_1$, $R_2$, $R_3$ and $R_4$ are hydrogen. The alkoxy groups typically have no greater than 12 carbon atoms. In favored embodiments, the alkoxy groups are independently methoxy or ethoxy. One representative species is 2,4,-bis(trichloromethyl)-6-(3,4-bis(methoxy)phenyl)-triazine. Such triazine crosslinking compound are further described in U.S. Pat. No. 4,330,590.

In some embodiments, the (meth)acrylic polymer and/or PSA comprises predominantly (greater than 50%, 60%, 70%, 80%, or 90% of the total crosslinks) or exclusively crosslinks from the cleavable crosslinking monomer. In such embodiment, the composition may be free of other non-cleavable crosslinking monomers, particularly multi(meth)acrylate crosslinkers such as 1, 6-hexane diol diacrylate (HDDA).

In some embodiments, the activation of the cleavable crosslinker is achieved by heating the composition to a temperature ranging from 85° C. to 150° C. for durations of time ranging from 5 to 10 minutes to 30 minutes. In the absence of a thermal acid generator, higher temperatures and/or longer heating times are typically utilized.

In other embodiments, the activation of the cleavable crosslinker is achieved by the addition of acid or a photoacid generator and exposing the composition to (e.g. ultraviolet) actinic radiation. When the polymer is cured by exposure to actinic radiation, the exposure conditions that cause cleavage are generally at a different and lower wavelength bandwidth than those utilized for polymerization of the (meth) acrylic polymer. The difference is typically at least about 25 nm.

Acids that can be used to initiate this type of fragmentation include, for example, sulfuric acid, p-toluene sulfonic acid, oxalic acid, and mixtures thereof.

In favored embodiments, activation of the cleavable crosslinker is catalyzed by an acid, photoacid generator ("PAG"), or thermal acid generator ("TAG"). Thus, inclusion of such can reduce the exposure time to actinic radiation, or reduce the time and temperature of heat activated cleavage of the crosslinking monomer. When present, the acid, photoacid or thermal acid generator is typically used in amounts of at least 0.005 or 0.01 wt. % and typically no greater than 10 wt-% of the composition. In some embodiments, the concentration is no greater than 5, 4, 3, 2, 1, or 0.5 wt. % of the composition.

Upon irradiation with light energy, ionic photoacid generators undergo a fragmentation reaction and release one or more molecules of Lewis or Brönsted acid that catalyze the cleavage of the cleavable crosslinking monomer. Useful photoacid generators are thermally stable and do not undergo thermally induced reactions with the copolymer, and are readily dissolved or dispersed in the composition. Preferred photoacid generators are those in which the incipient acid has a pKa value of ≤0. Photoacid generators are known and reference may be made to K. Dietliker, Chemistry and Technology of UV and EB Formulation for Coatings, Inks and Paints, vol. III, SITA Technology Ltd., London, 1991. Further reference may be made to Kirk-Othmer Encyclopedia of Chemical Technology, $4^{th}$ Edition, Supplement Volume, John Wiley and Sons, New York, year, pp 253-255.

Cations useful as the cationic portion of the ionic photoinitiators of the invention include organic onium cations, for example those described in U.S. Pat. Nos. 4,250,311, 3,708,296, 4,069,055, 4,216,288, 5,084,586, 5,124,417, 5,554,664 and such descriptions incorporated herein by reference, including aliphatic or aromatic Group IVA VIIA (CAS version) centered onium salts, preferably I-, S-, P-, Se-N- and C-centered onium salts, such as those selected from, sulfoxonium, iodonium, sulfonium, selenonium, pyridinium, carbonium and phosphonium, and most preferably I-, and S-centered onium salts, such as those selected from sulfoxonium, diaryliodonium, triarylsulfonium, diarylalkylsulfonium, dialkylarylsulfonium, and trialkylsulfonium wherein "aryl" and "alkyl" are as defined and having up to four independently selected substituents. The substituents on the aryl or alkyl moieties will preferably have less than 30 carbon atoms and up to 10 heteroatoms selected from N, S, non-peroxidic O, P, As, Si, Sn, B, Ge, Te, Se. Examples include hydrocarbyl groups such as methyl, ethyl, butyl, dodecyl, tetracosanyl, benzyl, allyl, benzylidene, ethenyl and ethynyl; hydrocarbyloxy groups such as methoxy, butoxy and phenoxy; hydrocarbylmercapto groups such as methylmercapto and phenylmercapto; hydrocarbyloxycarbonyl groups such as methoxycarbonyl and phenoxycarbonyl; hydrocarbylcarbonyl groups such as formyl, acetyl and benzoyl; hydrocarbylcarbonyloxy groups such as acetoxy and cyclohexanecarbonyloxy; hydrocarbylcarbonamido groups such as acetamido and benzamido; azo; boryl; halo groups such as chloro, bromo, iodo and fluoro; hydroxy; oxo; diphenylarsino; diphenylstilbino; trimethylgermano; trimethylsiloxy; and aromatic groups such as cyclopentadienyl, phenyl, tolyl, naphthyl, and indenyl. With the sulfonium salts, it is possible for the substituent to be further substituted with a dialkyl- or diarylsulfonium cation; an example of this would be 1,4-phenylene bis(diphenylsufonium).

Useful onium salts photoacid generator include diazonium salts, such as aryl diazonium salts; halonium salts, such as diarlyiodonium salts; sulfonium salts, such as triarylsulfonium salts, such as triphenyl sulfonium triflate; selenonium salts, such as triarylselenonium salts; sulfoxonium salts, such as triarylsulfoxonium salts; and other miscellaneous classes of onium salts such as triaryl phosphonium and arsonium salts, and pyrylium and thiopyrylium salts.

Ionic photoacid generators include, for example, bis(4-t-butylphenyl) iodonium hexafluoroantimonate (FP5034™ from Hampford Research Inc., Stratford, Conn.), a mixture of triarylsulfonium salts (diphenyl(4-phenylthio) phenylsufonium hexafluoroantimonate, bis(4-(diphenylsulfonio)phenyl)sulfide hexafluoroantimonate) available as Syna PI-6976™ from Synasia Metuchen, N.J., (4-methoxyphenyl)phenyl iodonium triflate, bis(4-tert-butylphenyl) iodonium camphorsulfonate, bis(4-tert-butylphenyl) iodonium hexafluoroantimonate, bis(4-tert-butylphenyl) iodonium hexafluorophosphate, bis(4-tert-butylphenyl) iodonium tetraphenylborate, bis(4-tert-butylphenyl) iodonium tosylate, bis(4-tert-butylphenyl) iodonium triflate, ([4-(octyloxy)phenyl]phenyliodonium hexafluorophosphate), ([4-(octyloxy)phenyl]phenyliodonium hexafluoroantimonate), (4-isopropylphenyl)(4-methylphenyl)iodonium tetrakis (pentafluorophenyl) borate (available s Rhodorsil 2074™ from Bluestar Silicones, East Brunswick, N.J.), bis(4-methylphenyl) iodonium hexafluorophosphate (available as Omnicat 440™ from IGM Resins Bartlett, Ill.), 4-(2-hydroxy-1-tetradecycloxy)phenyl]phenyl iodonium hexafluoroantimonate, triphenyl sulfonium hexafluoroantimonate (available as CT-548™ from Chitec Technology Corp. Taipei, Taiwan), diphenyl(4-phenylthio)phenylsufonium hexafluorophosphate, bis(4-(diphenylsulfonio)phenyl)sulfide bis(hexafluorophosphate), diphenyl(4-phenylthio)phenylsufonium hexafluoroantimonate, bis(4-(diphenylsulfonio)phenyl)sulfide hexafluoroantimonate, and blends of these triarylsulfonium salts available from Synasia, Metuchen, N.J. under the trade designations of Syna PI-6992™ and Syna PI-6976™ for the $PF_6$ and $SbF_6$ salts, respectively.

Optionally, it is within the scope of this invention to include photosensitizers or photoaccelerators with the photoacid generators. Use of photosensitizers or photoaccelerators alters the wavelength sensitivity of radiation-sensitive compositions employing the latent catalysts and photoacid generators of this invention. This is particularly advantageous when the photoacid generator does not strongly absorb the incident radiation. Use of photosensitizers or photoaccelerators increases the radiation sensitivity, allowing shorter exposure times and/or use of less powerful sources of radiation.

When a thermal acid generator (TAG) is included in the composition, the time and temperature of heat activated cleavage of the cleavable crosslinking monomer can be reduced. Further, the production of the thermally-generated acid can be controlled by the chemical structure of the TAG. In some embodiments, the amount of TAG included in the adhesive formulation is in a range from about 0.01 wt. % to about 0.1 wt. %.

Upon exposure to thermal energy, TAGs undergo a fragmentation reaction and release one or more molecules of Lewis or Bronsted acid. Useful TAGs are thermally stable up to the activation temperature. Preferred TAGs are those in which the incipient acid has a $pK_a$ value of less than or equal to 0. Useful thermal acid generators have an activation temperature of 150° C. or less, preferably 140° C. or less. As used herein, "activation temperature" is that temperature at which the thermal release of the incipient acid by the TAG in the adhesive formulation occurs. Typically the TAG will have an activation temperature in a range from about 50° C. to about 150° C.

Useful classes of TAGs can include, for example, alkylammonium salts of sulfonic acids, such as triethylammonium p-toluenesulfonate (TEAPTS). Another suitable class of TAGs is that disclosed in U.S. Pat. No. 6,627,384 (Kim, et al.), the disclosure of which is incorporated herein by reference, which describes cyclic alcohols with adjacent sulfonate leaving groups, such as any of the compounds of the Formulas 1 to 4:

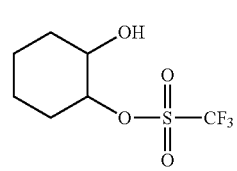

Formula 1

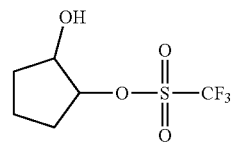

Formula 2

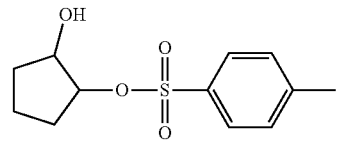

Formula 3

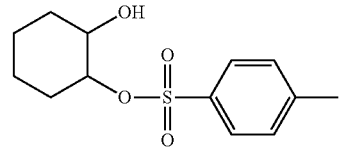

Formula 4

The sulfonate leaving groups in compounds of Formulas 1 to 4 form acids upon the application of heat as is demonstrated in the mechanism shown below.

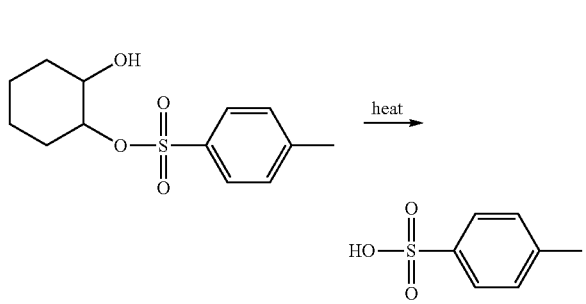

Suitable classes of thermal acid generators also include those described in U.S. Pat. No. 7,514,202 (Ohsawa et al.) and U.S. Pat. No. 5,976,690 (Williams et al.), the disclosures of which are incorporated herein by reference.

The (meth)acrylic copolymers can be polymerized by various techniques including, but not limited to, solvent polymerization, dispersion polymerization, solventless bulk polymerization, and radiation polymerization, including processes using ultraviolet light, electron beam, and gamma radiation. The monomer mixture may comprise a polymerization initiator, especially a thermal initiator or a photoinitiator of a type and in an amount effective to polymerize the comonomers.

A typical solution polymerization method is carried out by adding the monomers, a suitable solvent, and an optional chain transfer agent to a reaction vessel, adding a free radical initiator, purging with nitrogen, and maintaining the reaction vessel at an elevated temperature (e.g. about 40 to 100° C.) until the reaction is complete, typically in about 1 to 20 hours, depending upon the batch size and temperature. Examples of typical solvents include methanol, tetrahydrofuran, ethanol, isopropanol, acetone, methyl ethyl ketone, methyl acetate, ethyl acetate, toluene, xylene, and an ethylene glycol alkyl ether. Those solvents can be used alone or as mixtures thereof.

Useful initiators include those that, on exposure to heat or light, generate free-radicals that initiate (co)polymerization of the monomer mixture. The initiators are typically employed at concentrations ranging from about 0.0001 to about 3.0 parts by weight, preferably from about 0.001 to about 1.0 parts by weight, and more preferably from about 0.005 to about 0.5 parts by weight of the total monomer or polymerized units.

Suitable initiators include but are not limited to those selected from the group consisting of azo compounds such as VAZO 64 (2,2'-azobis(isobutyronitrile)), VAZO 52 (2,2'-azobis(2,4-dimethylpentanenitrile)), and VAZO 67 (2,2'-azobis-(2-methylbutyronitrile)) available from E.I. du Pont de Nemours Co., peroxides such as benzoyl peroxide and lauroyl peroxide, and mixtures thereof. The preferred oil-soluble thermal initiator is (2,2'-azobis-(2-methylbutyronitrile)). When used, initiators may comprise from about 0.05 to about 1 part by weight, preferably about 0.1 to about 0.5 part by weight based on 100 parts by weight of monomer components in the pressure sensitive adhesive.

The polymers have pendent unsaturated groups that can be crosslinked by a variety of methods. These include addition of thermal or photoinitiators followed by heat or UV exposure after coating. The polymers may also be crosslinked by exposure to electron beam or gamma irradiation.

Thus the (meth)acrylic polymer can be crosslinked by exposure to heat and/or or actinic (e.g. UV) radiation. The (meth)acrylic polymer can also be cleaved into fragments, by exposure to heat and/or actinic (e.g. UV). However, the exposure conditions for cleavage are generally different (higher temperature and/or lower wavelength bandwidth) than the exposure conditions for polymerization.

One method of preparing (meth)acrylic polymers includes partially polymerizing monomers to produce a syrup composition comprising the solute (meth)acrylic polymer and unpolymerized solvent monomer(s). The unpolymerized solvent monomer(s) typically comprises the same monomer as utilized to produce the solute (meth)acrylic polymer. If some of the monomers were consumed during the polymerization of the (meth)acrylic polymer, the unpolymerized solvent monomer(s) comprises at least some of the same monomer(s) as utilized to produce the solute (meth) acrylic polymer. Further, the same monomer(s) or other monomer(s) can be added to the syrup once the (meth) acrylic polymer has been formed. Partial polymerization provides a coatable solution of the (meth)acrylic solute polymer in one or more free-radically polymerizable solvent monomers. The partially polymerized composition is then coated on a suitable substrate and further polymerized.

In some embodiments, the cleavable crosslinking monomer is added to the monomer(s) utilized to form the (meth) acrylic polymer. Alternatively or in addition thereto, the cleavable crosslinking monomer may be added to the syrup after the (meth)acrylic polymer has been formed. The (meth) acrylate group of the crosslinker and other (e.g. (meth) acrylate) monomers utilized to form the (meth)acrylic polymer preferentially polymerize forming an acrylic backbone with the cleavable group.

The syrup method provides advantages over solvent or solution polymerization methods; the syrup method yielding higher molecular weight materials. These higher molecular weights increase the amount of chain entanglements, thus increasing cohesive strength. Also, the distance between cross-links can be greater with high molecular syrup polymer, which allows for increased wet-out onto a surface.

Polymerization of the (meth)acrylate solvent monomers can be accomplished by exposing the syrup composition to energy in the presence of a photoinitiator. Energy activated initiators may be unnecessary where, for example, ionizing radiation is used to initiate polymerization. Typically, a photoinitiator can be employed in a concentration of at least 0.0001 part by weight, preferably at least 0.001 part by weight, and more preferably at least 0.005 part by weight, relative to 100 parts by weight of the syrup.

A preferred method of preparation of the syrup composition is photoinitiated free radical polymerization. Advantages of the photopolymerization method are that 1) heating the monomer solution is unnecessary and 2) photoinitiation is stopped completely when the activating light source is turned off. Polymerization to achieve a coatable viscosity may be conducted such that the conversion of monomers to polymer is up to about 30%. Polymerization can be terminated when the desired conversion and viscosity have been achieved by removing the light source and by bubbling air (oxygen) into the solution to quench propagating free radicals. The solute polymer(s) may be prepared conventionally in a non-monomeric solvent and advanced to high conversion (degree of polymerization). When solvent (monomeric or non-monomeric) is used, the solvent may be removed (for example by vacuum distillation) either before or after formation of the syrup composition. While an acceptable method, this procedure involving a highly converted functional polymer is not preferred because an additional solvent removal step is required, another material may be required (a non-monomeric solvent), and dissolution of the high molecular weight, highly converted solute polymer in the monomer mixture may require a significant period of time.

The polymerization is preferably conducted in the absence of solvents such as ethyl acetate, toluene and tetrahydrofuran, which are non-reactive with the functional groups of the components of the syrup composition. Solvents influence the rate of incorporation of different monomers in the polymer chain and generally lead to lower molecular weights as the polymers gel or precipitate from solution. Thus, the (e.g. pressure sensitive) adhesive can be free of unpolymerizable organic solvent.

Useful photoinitiators include benzoin ethers such as benzoin methyl ether and benzoin isopropyl ether; substituted acetophenones such as 2,2-dimethoxy-2-phenylacetophenone photoinitiator, available the trade name IRGACURE 651 or ESACURE KB-1 photoinitiator (Sartomer Co., West Chester, Pa.), and dimethylhydroxyacetophenone; substituted α-ketols such as 2-methyl-2-hydroxy propiophenone; aromatic sulfonyl chlorides such as 2-naphthalene-sulfonyl chloride; and photoactive oximes such as 1-phenyl-1,2-propanedione-2-(O-ethoxy-carbonyl)oxime.

Particularly preferred among these are the substituted acetophenones.

Preferred photoinitiators are photoactive compounds that undergo a Norrish I cleavage to generate free radicals that can initiate by addition to the acrylic double bonds. The photoinitiator can be added to the mixture to be coated after the polymer has been formed, i.e., photoinitiator can be added to the syrup composition. Such polymerizable photoinitiators are described, for example, in U.S. Pat. Nos. 5,902,836 and 5,506,279 (Gaddam et al.).

Such photoinitiators preferably are present in an amount of from 0.1 to 1.0 part by weight, relative to 100 parts by weight of the total syrup content. Accordingly, relatively thick coatings can be achieved when the extinction coefficient of the photoinitiator is low.

The syrup composition and the photoinitiator may be irradiated with activating UV radiation to polymerize the monomer component(s). UV light sources can be of two types: 1) relatively low light intensity sources such as blacklights, which provide generally 10 mW/cm$^2$ or less (as measured in accordance with procedures approved by the United States National Institute of Standards and Technology as, for example, with a UVIMAP UM 365 L-S radiometer manufactured by Electronic Instrumentation & Technology, Inc., in Sterling, Va.) over a wavelength range of 280 to 400 nanometers; and 2) relatively high light intensity sources such as medium pressure mercury lamps which provide intensities generally greater than 10 mW/cm$^2$, preferably 15 to 450 mW/cm$^2$. Where actinic radiation is used to fully or partially polymerize the syrup composition, high intensities and short exposure times are preferred. For example, an intensity of 600 mW/cm$^2$ and an exposure time of about 1 second may be used successfully. Intensities can range from 0.1 to 150 mW/cm$^2$, preferably from 0.5 to 100 mW/cm$^2$, and more preferably from 0.5 to 50 mW/cm$^2$.

In some embodiments, it is preferable to select a photoinitiator and photoacid generator combination wherein the PAG exhibits little to no UV absorption when a higher wavelength UV irradiation (e.g., UVA radiation, having a wavelength of 400 nm to 315 nm) is used to activate the photoinitiator and polymerize the monomer components, such that activation of the PAG and the cleavable crosslinkers is minimized or nonexistent during this polymerization step. Upon subsequent irradiation of the polymerized material with lower wavelength, high intensity UV irradiation (e.g., UVC radiation, having a wavelength of 280 nm to 100 nm), the PAG may be activated, and cleavable crosslinkers in the polymerized network may be cleaved.

The degree of conversion can be monitored during the irradiation by measuring the index of refraction of the polymerizing medium as previously described. Useful coating viscosities are achieved with conversions (i.e., the percentage of available monomer polymerized) in the range of up to 30%, preferably 2% to 20%, more preferably from 5% to 15%, and most preferably from 7% to 12%. The molecular weight (weight average) of the solute polymer(s) is at least 100,000 g/mole, 500,000 g/mole, or greater.

When preparing (meth)acrylic polymers described herein, it is expedient for the photoinitiated polymerization reactions to proceed to virtual completion, i.e., depletion of the monomeric components, at temperatures less than 70° C. (preferably at 50° C. or less) with reaction times less than 24 hours, preferably less than 12 hours, and more preferably less than 6 hours. These temperature ranges and reaction rates obviate the need for free radical polymerization inhibitors, which are often added to acrylic systems to stabilize against undesired, premature polymerization and gelation. Furthermore, the addition of inhibitors adds extraneous material that will remain with the system and inhibit the desired polymerization of the syrup composition and formation of the crosslinked pressure-sensitive adhesives. Free radical polymerization inhibitors are often required at processing temperatures of 70° C. and higher for reaction periods of more than 6 to 10 hours.

The pressure-sensitive adhesives may optionally contain one or more conventional additives. Preferred additives include tackifiers, plasticizers, dyes, antioxidants, UV stabilizers, and (e.g. inorganic) fillers such as (e.g. fumed) silica and glass bubbles. In some embodiments no tackifier is used. When tackifiers are used, the concentration can range from 5 or 10, 15 or 20 wt. % or greater of the (e.g. cured) adhesive composition.

Various types of tackifiers include phenol modified terpenes and rosin esters such as glycerol esters of rosin and pentaerythritol esters of rosin that are available under the trade designations "Nuroz", "Nutac" (Newport Industries), "Permalyn", "Staybelite", "Foral" (Eastman). Also available are hydrocarbon resin tackifiers that typically come from C5 and C9 monomers by products of naphtha cracking and are available under the trade names "Piccotac", "Eastotac", "Regalrez", "Regalite" (Eastman), "Arkon" (Arakawa), "Norsolene", "Wingtack" (Cray Valley), "Nevtack", LX (Neville Chemical Co.), "Hikotac", "Hikorez" (Kolon Chemical), "Novares" (Rutgers Nev.), "Quintone" (Zeon), "Escorez" (Exxonmobile Chemical), "Nures", and "H-Rez" (Newport Industries). Of these, glycerol esters of rosin and pentaerythritol esters of rosin, such as available under the trade designations "Nuroz", "Nutac", and "Foral" are considered biobased materials.

The (meth)acrylic polymer and PSA compositions can be coated on a substrate using conventional coating techniques modified as appropriate to the particular substrate. For example, these compositions can be applied to a variety of solid substrates by methods such as roller coating, flow coating, dip coating, spin coating, spray coating knife coating, and die coating. The composition may also be coated from the melt. These various methods of coating allow the compositions to be placed on the substrate at variable thicknesses thus allowing a wider range of use of the compositions. Coating thicknesses may vary from about 25 to 1500 microns (dry thickness). In typical embodiments, the coating thickness ranges from about 50 to 250 microns.

When the substrate is a release liner, the crosslinked polymer composition may be a free-standing polymeric film. The substrate can take any suitable form, such as, for example, a sheet, a fiber, or a shaped article.

The method of applying and activating the composition will vary depending on the desired use of the composition. In favored embodiments, activation of the composition occurs after applying the composition to a substrate. However, in alternative embodiments activation of the composition occurs prior to applying the composition to a substrate or concurrently with application to a substrate.

The PSAs may be coated upon a variety of flexible and inflexible backing materials using conventional coating techniques to produce adhesive-coated materials. Flexible substrates are defined herein as any material which is conventionally utilized as a tape backing or may be of any other flexible material. Examples include, but are not limited to plastic films such as polypropylene, polyethylene, polyvinyl chloride, polyester (polyethylene terephthalate), polycarbonate, polymethyl(meth)acrylate (PMMA), cellulose acetate, cellulose triacetate, and ethyl cellulose. Foam backings may be used. In some embodiments, the backing is comprised of a bio-based material such as polylactic acid (PLA).

The PSA can also be provided in the form of a pressure-sensitive adhesive transfer tape in which at least one layer of the adhesive is disposed on a release liner for application to a permanent substrate at a later time. The adhesive can also be provided as a single coated or double coated tape in which the adhesive is disposed on a permanent backing.

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metalized polymer films, or ceramic sheet materials may take the form of any article conventionally known to be utilized with pressure-sensitive adhesive compositions such as labels, tapes, signs, covers, marking indicia, and the like.

Backings can be made from plastics (e.g., polypropylene, including biaxially oriented polypropylene, vinyl, polyethylene, polyester such as polyethylene terephthalate), nonwovens (e.g., papers, cloths, nonwoven scrims), metal foils, foams (e.g., polyacrylic, polyethylene, polyurethane, neoprene), and the like. Foams are commercially available from various suppliers such as 3M Co., Voltek, Sekisui, and others. The foam may be formed as a coextruded sheet with the adhesive on one or both sides of the foam, or the adhesive may be laminated to it. When the adhesive is laminated to a foam, it may be desirable to treat the surface to improve the adhesion of the adhesive to the foam or to any of the other types of backings. Such treatments are typically selected based on the nature of the materials of the adhesive and of the foam or backing and include primers and surface modifications (e.g., corona treatment, surface abrasion).

In some embodiments, the backing material is a transparent film having a transmission of visible light of at least 90 percent. The transparent film may further comprise a graphic. In this embodiment, the adhesive may also be transparent.

Objects and advantages of this invention are further illustrated by the following examples. The particular materials and amounts, as well as other conditions and details, recited in these examples should not be used to unduly limit this invention.

EXAMPLES

TABLE 1

MATERIALS LIST

| Abbreviation | Description | Obtained From |
|---|---|---|
| IOA | isooctyl acrylate | Sigma Aldrich, St. Louis, MO |
| AA | acrylic acid | Alfa Aesar, Ward Hill, MA |
| | 1,4-bis(vinyloxy)butane | Sigma Aldrich, St. Louis, MO |
| | cyclohexane | Sigma Aldrich, St. Louis, MO |
| HDDA | 1,6-hexanediol diacrylate | Sigma Aldrich, St. Louis, MO |
| | 2-hydroxyethyl acrylate | Sigma Aldrich, St. Louis, MO |
| CCD-1 | Cleavable crosslinker diacrylate 1 | Preparatory Example 1 |
| CCD-2 | Cleavable crosslinker diacrylate 2 | Preparatory Example 2 |
| | 2,2-dimethoxypropane | Sigma Aldrich, St. Louis, MO |
| I-651 | IRGACURE 651 initiator | BASF, Florey Park, NJ |
| IBOA | isobornyl acrylate | Sartomer, Exton, PA |
| MEHQ | hydroquinone monomethyl ether | Sigma Aldrich, St. Louis, MO |
| | p-toluenesulfonic acid monohydrate | Sigma Aldrich, St. Louis, MO |
| TEAPTS | triethylammonium para-toluene sulfonate | Preparatory Example 3 |
| THF | tetrahydrofuran | Sigma Aldrich, St. Louis, MO |

TABLE 1-continued

MATERIALS LIST

| Abbreviation | Description | Obtained From |
|---|---|---|
| TPST | triphenylsulfonium triflate photoacid generator | Sigma Aldrich, St. Louis, MO |
| F3085 | FORAL 3085 Tackifier | Pinova, Brunswick, GA |
| S141 | SANTICIZER 141 Plasticizer | Ferro, Brakpan South Africa |
| T10 | T10 silicone treated poly(ethylene terephthalate) release liner | Solutia, Inc., St Louis, MO |
| T50 | T50 silicone treated poly(ethylene terephthalate) release liner | Solutia, Inc., St Louis, MO |

Test Method 1: Dynamic Mechanical Analysis of Homopolymer Films

Dynamic mechanical analysis ("DMA") of polymerized samples was carried out using a rheometer (obtained from TA Instruments, New Castle, Del., under the trade designation "AR2000 PARALLEL PLATE RHEOMETER") to characterize the physical properties of each sample as a function of temperature. For each sample, 50 micrometer thick sheets of the polymerized adhesive sample were laminated together to achieve a 1 mm thick slab. A circular punch with a diameter of 8 mm was used to cut a sample from this slab which was then centered between the 8 mm diameter parallel plates of the rheometer. The temperature was then scanned from −15° C. to 140° C. at a rate of 3° C./min. while the parallel plates were oscillated at a frequency of 1 Hz and a constant strain of 0.4%. Physical parameters of the material were recorded during the temperature ramp, including storage modulus (G'), loss modulus (G"), and Tan Delta (i.e., G"/G').

Test Method 2: Gel Fraction % Analysis

To determine the fraction of crosslinked polymer or gel within each material, formulations were coated at approximately 0.05 mm and UV cured between silicone coated release liners T10 and T50. Squares of 1 inch by 1 inch (2.54 cm by 2.54 cm) were cut from each adhesive film, the release liners were removed, and the adhesive square was then transferred to a steel mesh cage of dimensions 1.5 inch by 1.5 inch by 0.5 inch (3.8 cm by 3.8 cm by 1.3 cm) and of known mass. The mass of the cage and sample was recorded, and the cage was submersed in toluene for a period of 24 hours. After this time, the cage was removed from the toluene and dried in an oven for 2 hours at 120° C. The mass of the cage and dried sample was recorded and the gel fraction was calculated using the following formula:

$$\text{Gel Fraction \%} = ((M_{FP} - M_c)/(M_{IP} - M_c)) \times 100$$

where $M_c$ was the mass of the cage, $M_{FP}$ was the mass of the cage and final dried polymer film, and $M_{IP}$ was the mass of the cage and initial polymer film. Two samples for each adhesive film were tested and the gel fraction averaged.

Test Method 3: Peel Adhesion Test on Glass

A test sample was prepared by placing a 0.5 inch (12.2 cm) wide by 7 inches (178 cm) long adhesive coated tape on a 100 cm by 250 cm glass plate. The glass plate was cleaned by wiping with 2-propanol before testing. The tape was rolled down onto the panel with two passes of a 2 kg roller. The test was conducted on a slip/peel tester (obtained from Instrumentors Inc., Strongsville, Ohio). The tape was removed from the plate at a peel angle of 180° and a platen speed of 90 inches per minute (2.29 m/min.) for a total of 2 seconds after aging on the glass plate. The aging was for 10 min at 23° C., or 24 hr at 23° C., or 24 hr at 85° C. The force required to remove the tape was measured in grams per 0.5 inch (1.3 cm) and converted to Newtons/decimeter (N/dm). Results were the average of three tests on each adhesive.

Test Method 4: Peel Adhesion Test on Stainless Steel

Peel adhesion was the force required to remove a coated flexible sheet material from a clean stainless steel test panel, measured at a specific angle and rate of removal. The stainless steel panel was cleaned by wiping with 2-propanol before testing. In the examples, the force was expressed in Newtons force per width of coated sheet (i.e., N/dm). For each test, a 12.2 mm width of the adhesive coated sheet material approximately 10-12 cm long was cut and the release layer was peeled away from the coated adhesive. The adhesive strip was then applied to the clean face of a stainless steel test panel. A 2 kg rubber roller was used to apply the strip. The free end of the coated strip was doubled back so that the angel of removal was 180 degrees. The free end was attached to the horizontal arm of the adhesion tester scale. The stainless steel plate was then affixed to the platform of the instrument which was mechanized to move at a controlled rate (12"/min. (30 cm/min.)) away from the scale. The peel test was initiated 5 minutes after the adhesive was applied to the substrate. The scale reading was read during the test as an average of both the peak and minimum forces during the peel. Three peel tests were run for each sample and averaged to yield the peel adhesion value.

Test Method 5: High Temperature Shear Strength

Shear strength was measured as time required to pull a defined area of adhesive coated backing material from a stainless steel test panel under the stress of a constant or static load parallel to the test panel. Shear tests were conducted using adhesive coated poly(ethylene terephthalate) ("PET") material with approximately a 0.08 mm thick adhesive coating. Cut adhesive strips were applied to a clean stainless steel panel such that a 25.4 mm by 12.7 mm portion of each strip was in firm contact with the panel and one end portion of each strip was free. The panel with adhesive strip was held in a rack such that the panel formed a 180 degree angle with the extended free end portion of the strip. The free end portion of the strip was then tensioned by applying a one kilogram hanging weight. The rack was enclosed in a 70° C. oven and the time elapsed for each tape example to separate from the test panel was recorded as the shear strength in minutes. Two shear tests were performed for each sample adhesive and the shear strength averaged. Shear samples hanging more than 10,000 minutes were manually taken down and recorded as +10,000.

Test Method 6: Wet-Out Test

A glass slide with dimensions of 3 inches (7.6 cm) by 1 inch (2.5 cm) was held at an angle of 69° and dropped on the self-wetting adhesive surface. The time to wet-out the glass slide was recorded in seconds and divided by the area wet-out (i.e., 3 in$^2$ for the glass slide). The test was performed three times for each sample, and the average value for time to wet-out was reported.

Test Method 7: Tensile Test

Sample films were cut to 6 cm×1 cm strips and process liners (T10/T50) were removed. The ends of each strip were reinforced with 3M 8403 tape to insure minimal slipping of the sample in the tensile grips. This was done by wrapping each test strip end with the 3 layers of the tape leaving 3.5 cm of the middle section of the sample strip exposed. The sample was then fitted into the tensile grips of a TA XT PLUS TEXTURE ANALYZER (Texture Technologies Corp., Scarsdale, N.Y.) leaving a 3.5 cm gap between grips. During the test run, the clamp separation speed was set at 1 mm/s and run until the test sample experienced material failure in the middle section of the strip. Two runs were carried out for each sample and the peak force at break as well as the percent strain at break was recorded. Percent strain at break was calculated as the clamp separation distance upon break divided by the initial clamp distance multiplied by 100%.

Preparatory Example 1

Preparation of Cleavable Crosslinker Diacrylate 1 "CCD-1" 2,2-di(2-acryloxyethoxy)propane)

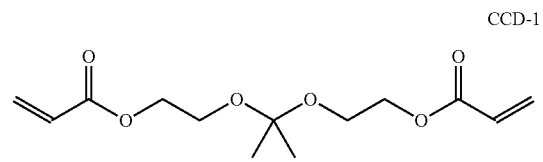 [SMILES: C=CC(=O)OCCOC(C)(C)OCCOC(=O)C=C]

CCD-1

To a mixture of 785 g (6.76 moles, 3 eq) of 2-hydroxyethyl acrylate and 0.429 g (2.25 mmol, 0.001 eq) of p-toluenesulfonic acid (monohydrate) was added 235 g (2.25 moles, 1 eq) of 2,2-dimethoxypropane, 0.236 g of MEHQ and 1.12 L of cyclohexane. A steady stream of air was passed through the flask and the mixture was heated to 80° C. Methanol was collected by azeotropic distillation (approximately 160 mL was collected). The mixture was heated at 80° C. for a total of 10 hours. Air was passed through the solution for several days to remove the solvent. The reaction mixture was diluted with approximately 400 mL of ethyl acetate and extracted with 200 mL of saturated aqueous sodium bicarbonate solution followed by several water/brine washes. After approximately 7 L of aqueous wash a sample was concentrated and $^1$H NMR analysis indicated less than 1% residual 2-hydroxyethylacrylate remaining. This mixture was concentrated under reduced pressure and then air was passed through this mixture for several hours until $^1$H NMR analysis showed less than 0.05% ethyl acetate remaining. A total of 429 grams (64% yield) of product (CCD-1) was obtained.

Preparatory Example 2

Preparation of Cleavable Crosslinker Diacrylate 2 "CCD-2" (butane-1,4-diylbis(oxy))bis(ethane-1,1-diyl) diacrylate)

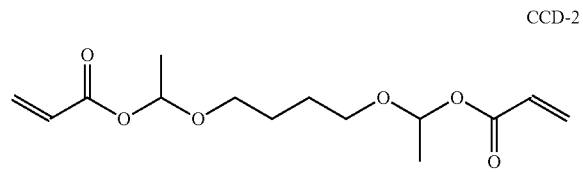 [SMILES: C=CC(=O)OC(C)OCCCCOC(C)OC(=O)C=C]

CCD-2

To 10.0 g (70.3 mmol, 1 eq) of 1,4-bis(vinyloxy)butane stirred at room temperature was added 11.2 g (155 mmol, 2.2 eq) of acrylic acid in a dropwise fashion. The reaction mixture was heated to 35° C. and then exothermed to 50° C. The reaction was maintained at 45° C. for 4 hours and then heated to 50° C. for 14 hours. The mixture was diluted with ethyl acetate, filtered and washed with saturated aqueous sodium bicarbonate. The organic layer was concentrated under reduced pressure to give 16.9 grams (84% yield) of product (CCD-2).

Preparatory Example 3

Thermal Acid Generator Triethyl Ammonium Paratoluene Sulfonate (TEAPTS)

To a solution of 10.0 g (52.6 mmol, 1 eq) of p-toluenesulfonic acid (monohydrate) in 30.0 mL of THF was added 6.38 g (63.1 mmol, 1.2 eq) of triethylamine. The reaction mixture exothermed to 40° C. and was allowed to stir for three hours and then concentrated under reduced pressure (40° C., 20 torr (~2700 Pa), 2 hours). The product was a viscous liquid that was soluble in THF, methyl ethyl ketone, or isopropyl alcohol, and was insoluble in ethyl acetate.

Example 1

Uncatalyzed Thermal Activation of Crosslinked PSA

An Example 1 adhesive formulation was prepared using the following procedure. 93 g of IOA, 7 g of AA and 0.04 g of 1-651 were mixed together using a magnetic stir bar in a clear glass vial. The glass vial was then purged with nitrogen for 5 minutes to remove dissolved oxygen and then placed in front of a UV light (365 nm, ~5 mW/cm$^2$) until a coatable viscosity was achieved. A typical target for the coatable viscosity for this step was approximately 3000 cP at room temperature. Each "thickened" sample was then formulated with additional photoinitiator and crosslinker as described in Table 2 below. As an example formulation, 100 g of "thickened" monomer formulation was added to an amber vial with 0.160 g (0.16 parts per hundred ("pph")) of 1-651 and 0.10 g (0.1 pph) of HDDA. The amber vial was then rotated until the solid ingredients were completely dissolved. The adhesive formulation was then coated at 0.05 mm between T10 and T50 silicone treated PET release liners. This construction was then cured using approximately 600 mJ/cm$^2$ of 360 nm wavelength UV irradiation.

TABLE 2

| Sample | IOA, wt. % | AA, wt. % | Total I-651, wt. % | HDDA, wt. % | CCD-1, wt. % |
|---|---|---|---|---|---|
| CE1 | 92.72 | 6.98 | 0.2 | 0.1 | 0 |
| EX1 | 92.7 | 6.98 | 0.2 | 0 | 0.12 |

Rheological measurements were performed following Test Method 1 using the adhesive films generated in Table 2. For the initial test, samples were heated from −15° C. to 140° C. at a rate of 3° C./minute and the storage modulus of the adhesive at 100° C. and 1 Hz was recorded. After this initial heating ramp, samples were considered "activated", at which point the temperature scan was repeated and the modulus again recorded at 100° C. and 1 Hz.

TABLE 3

Modulus Before and After Thermal Activation

| | G' (Pa) @ 100° C. and 1 Hz | | |
|---|---|---|---|
| Sample | Before Activation | After Activation | Modulus Change (%) |
| CE1 | 23930 | 23300 | 2.6 |
| EX1 | 18600 | 14340 | 22.9 |

To assess the degree of crosslinking, gel content measurements were performed after the samples were subjected to elevated temperatures, following Test Method 2 above, with results as summarized in Table 4. Generally, gel fraction % decreased with increased temperature for EX1, while it appeared relatively unchanged for CE1.

TABLE 4

Gel Fraction Before and After Thermal Activation

| | 25° C. - Before Activation | | 85° C. | | 100° C. | | 120° C. | | 150° C. | |
|---|---|---|---|---|---|---|---|---|---|---|
| Sample | 5 min | 30 min | 5 min | 30 min | 5 min | 30 min | 5 min | 30 min | 5 min | 30 min |
| CE1 | ND | 93% | ND | 93% | ND | 92% | ND | 93% | ND | 94% |
| EX1 | 94% | 93% | 92% | 90% | 89% | 85% | 85% | 60% | 60% | 41% |

ND = not determined

Example 2, Example 3, and Comparative Example 2

A composition was prepared by adding 200 g of IOA and 0.32 wt. % 1-651 in a clear quart jar and then sparging with nitrogen for 15 minutes. The composition was then irradiated with ultraviolet light (SYLVANIA BLACKLIGHT 350 nm) for 30 seconds to pre-polymerize the composition. Upon completion of the irradiation, the pre-polymerized material was bubbled with oxygen to stop the polymerization for 30 seconds. The material was magnetically stirred until a homogenous mixture was achieved. From this pre-polymerized material, 20 g aliquots were taken. For Comparative Example 2, 2 grams (17 mmol) of HDDA and 0.3 g 1-651 were added to one of the 20 g aliquots of pre-polymerized material. This mixture was magnetically stirred until a homogenous mixture was achieved. For Examples 2 and 3, 20 g aliquots of pre-polymerized material were treated as in the preparation of CE2, except using the amounts of HDDA and crosslinker CCD-1 or CCD-2 as detailed in Table 5.

TABLE 5

| Example | IOA, wt. % | HDDA, wt. % | CCD-1 wt. % | CCD-2 wt. % | I-651, wt. % |
|---|---|---|---|---|---|
| CE2 | 90.5 | 9.05 | 0 | 0 | 0.45 |
| EX2 | 90.5 | 0.18 | 8.87 | 0 | 0.45 |
| EX3 | 90.5 | 0.18 | 0 | 8.87 | 0.45 |

Each of the pre-polymerized mixtures of Table 5 was poured onto a 2 mil (51 micrometers) 3 SAB PET (Mitsubishi, Greer, S.C.) and knife-coated at 2 mil (51 micrometers) thickness. The coated adhesives were then each passed twice under a FUSION D bulb at 30 feet (9.1 meters) per minute under a nitrogen inerted atmosphere to produce final, cured adhesive. Cured adhesive samples were activated at 80° C. for 4 hours as indicated in Table 6 below and then tested for peel adhesion force to glass, following Test Method 3 above.

TABLE 6

180 Peel on Glass Before and After Activation at 80° C. for 4 hours

| Sample | Initial 180° Peel (N/dm) | Activated 180° Peel (N/dm) |
|---|---|---|
| CE2 | 0.8 | 3.2 |
| EX2 | 1.3 | 21.4 |
| EX3 | 1.1 | 21.4 |

PSAs containing cleavable crosslinkers can provide comparable wet-out rates on glass to conventional (non-cleavable crosslinker), as measured by Test Method 6. The test results are summarized in Table 7.

TABLE 7

| Sample | Initial Wet-out, sec/in² (sec/cm²) |
|---|---|
| CE2 | 1.1 (0.17) |
| EX2 | 1.2 (0.19) |
| EX3 | 1.4 (0.22) |

Examples 4 to 8, and Comparative Example 3

PSA examples were generated having components according to Table 8, generally following the method described for Example 1, except that a thermal acid generator (TEAPTS) was added in select samples.

TABLE 8

| Sample | IOA, wt. % | AA, wt. % | I-651, wt. % (total) | HDDA, wt. % | CCD-1, wt. % | TEAPTS, wt. % |
|---|---|---|---|---|---|---|
| CE3 | 92.63 | 6.97 | 0.2 | 0.15 | 0 | 0.05 |
| EX4 | 92.63 | 6.97 | 0.2 | 0 | 0.2 | 0 |
| EX5 | 92.58 | 6.97 | 0.2 | 0 | 0.2 | 0.05 |
| EX6 | 84.24 | 6.34 | 0.18 | 0.18 | 9.06 | 0 |
| EX7 | 84.22 | 6.34 | 0.18 | 0.18 | 9.06 | 0.02 |
| EX8 | 84.16 | 6.33 | 0.18 | 0.18 | 9.05 | 0.09 |

Gel fraction % measurements were made for CE3, EX4 and EX5, with results as summarized in Table 9.

TABLE 9

Gel Fraction Before and After Thermal Activation

| Sample | 25° C. Before Activation | 85° C. 10 min | 100° C. 10 min | 120° C. 10 min | 150° C. 10 min |
|---|---|---|---|---|---|
| CE3 | 93% | 93% | 92% | 92% | 92% |
| EX4 | 92% | 85% | 83% | 72% | 38% |
| EX5 | 85% | 42% | 31% | 0% | 0% |

Examples 6 to 8 were evaluated for Peel Adhesion to stainless steel as well as shear adhesion to stainless steel, with results as summarized in Table 10.

TABLE 10

Peel and Shear Adhesion Before and After Activation

| | 180 Degree Peel on Stainless Steel | | | | 70° C. Shear on Stainless Steel |
|---|---|---|---|---|---|
| Sample | Initial at 25° C. (N/dm) | 15 min 80° C. (N/dm) | 15 min at 100° C. (N/dm) | 15 min at 120° C. (N/dm) | after 15 min at 120° C. (min) |
| EX6 | 1.2 | 1.2 | 1.5 | 1.9 | +10,000 |
| EX7 | 1.2 | 1.5 | 2.0 | 5.0 | +10,000 |
| EX8 | 1.8 | 3.0 | 7.3 | 17.1 | +10,000 |

Examples 9 to 17, and Comparative Examples 4 and 5

Adhesive coatings including were also prepared with various amounts of photoacid generator ("PAG") triphenylsulfonium triflate ("TPST"), according to the methods described above, using the amounts of materials listed in Table 11 below.

TABLE 11

| Sample | IOA, wt. % | AA, wt. % | IBOA, wt. % | I-651, wt. % (total) | HDDA, wt. % | CCD-1, wt. % | CCD-2, wt. % | TPST, wt. % |
|---|---|---|---|---|---|---|---|---|
| CE4 | 92.54 | 6.97 | 0 | 0.2 | 0.25 | 0 | 0 | 0.05 |
| CE5 | 63.50 | 4.54 | 22.68 | 0.18 | 9.07 | 0 | 0 | 0.03 |
| EX9 | 92.53 | 6.96 | 0 | 0.2 | 0 | 0 | 0.3 | 0.01 |
| EX10 | 92.35 | 6.95 | 0 | 0.2 | 0 | 0 | 0.3 | 0.20 |
| EX11 | 92.49 | 6.96 | 0 | 0.2 | 0 | 0 | 0.3 | 0.05 |
| EX12 | 92.49 | 6.96 | 0 | 0.2 | 0 | 0.3 | 0 | 0.05 |
| EX13 | 92.35 | 6.95 | 0 | 0.2 | 0 | 0.3 | 0 | 0.2 |
| EX14 | 84.41 | 6.03 | 0 | 0.24 | 0.24 | 9.04 | 0 | 0.04 |
| EX15 | 81.94 | 5.85 | 0 | 0.23 | 0.23 | 11.71 | 0 | 0.04 |
| EX16 | 86.17 | 6.49 | 0 | 0.19 | 0.19 | 6.95 | 0 | 0.03 |
| EX17 | 84.22 | 6.34 | 0 | 0.18 | 0.18 | 9.06 | 0 | 0.03 |

Example 18

Adhesive coatings including various amounts of the photoacid generator ("PAG") triphenylsulfonium triflate ("TPST") as well as a tackifier and a plasticizer were prepared, according to the method 1 described above, using the amounts of materials listed in Table 12 below.

TABLE 12

| Sample | IOA wt. % | AA wt. % | IBOA wt. % | I-651 wt. % (total) | HDDA wt. % | CCD-1 wt. % | F3085 Tackifier wt. % | S141 Plasticizer wt. % | TPST wt. % |
|---|---|---|---|---|---|---|---|---|---|
| EX18 | 64.39 | 4.85 | 13.85 | 0.14 | 0.14 | 8.31 | 6.92 | 1.38 | 0.02 |

As summarized in Table 13 below, Examples 9-13 all had high gel content prior to activation as typically observed with crosslinked acrylic PSA systems. However, upon irradiation, with high intensity UVC light using a FUSION UV DRS conveyor system (Heraeus Noblelight Fusion UB Inc., Gaithersburg, Md.), the gel content of systems containing cleavable crosslinker (Examples 9-13) generally decreased, which appeared to be a function of both the applied UV dose and the concentration of PAG catalyst used. Contrarily, the gel content of Comparative Example 4 using the non-cleavable crosslinker HDDA did not change.

TABLE 13

Gel Fraction Before and After PAG Catalyzed Actinic Energy Activation

| Sample | 0 J/cm² | 40 mJ/cm² UVC | 52 mJ/cm² UVC | 76 mJ/cm² UVC |
|---|---|---|---|---|
| CE4 | 96% | 96% | ND | 96% |
| EX9 | 89% | 55% | ND | 14% |
| EX10 | 92% | 8% | ND | 6% |
| EX11 | 88% | 2% | ND | 1% |
| EX12 | 86% | ND | 2% | ND |
| EX13 | 84% | ND | 2% | ND |

ND = not determined

Table 14 depicts that Example 16 and 17 decrease in Tg and G' by activation of the cleavable crosslinking monomer; while the control example CE4 exhibited little change. Example 17 demonstrates a material that was initially above the Dahlquist criterion exhibiting little to no tack. Upon irradiation, with high intensity UVC light using a FUSION UV DRS conveyor system, the modulus decreased significantly below the Dahlquist criterion providing a tacky PSA material upon activation with irradiation.

TABLE 14

| | Tg at 1 Hz (° C.) | | Storage Modulus G' (Pa) at 25° C. and 1 Hz | | |
|---|---|---|---|---|---|
| Example | Initial 0 J/cm² | Activated 52 mJ/cm² UVC | Initial 0 J/cm² | Activated 52 mJ/cm² UVC | Modulus Change (%) |
| CE4 | −6.8 | −6.8 | 86,010 | 86,500 | 0.6 |
| E16 | −4.6 | −6.0 | 237,000 | 85,980 | 63.7 |
| E17 | −2.0 | −5.8 | 366,000 | 86,100 | 76.5 |

Peel and shear adhesion measurements were made, as summarized in Table 15 below. Similar to the thermally activated systems of Table 10, before UV activation—(i.e., 0 J/cm² dose), each sample had relatively low peel performance. However, as the PSA was activated peel performance generally increased.

TABLE 15

Peel and Shear Adhesion Before and After Activation

| | 180 Degree Peel on Stainless Steel | | 70° C. Shear on Stainless Steel |
|---|---|---|---|
| Sample | Initial 0 J/cm² (N/dm) | Activated 76 mJ/cm² UVC (N/dm) | after Activation 76 mJ/cm² UVC (min) |
| CE5 | 6.2 | 4.0 | +10,000 |
| EX14 | 4.0 | 37.0 | +10,000 |
| EX15 | 3.2 | 20.2 | +10,000 |
| EX18 | 2.5 | 14.9 | ND |

ND = not determined

Example 19

A polymer coating was also prepared in a similar manner to Example 1, using the formulation outlined in Table 16 below.

TABLE 16

| Sample | IOA, wt. % | IBOA, wt % | AA Wt % | Total I-651, wt. % | HDDA, wt. % | CCD-1, wt. % | TPST wt % |
|---|---|---|---|---|---|---|---|
| EX19 | 45.1 | 43.2 | 1.8 | 0.2 | 1 | 8.6 | 0.2 |

The polymer coating of EX19 of Table 16 was analyzed using dynamic mechanical analysis as outlined in Test Method 1 as well as for tensile properties, as outlined in Test Method 7 before and after activation. Coatings of 0.5 mm thickness were prepared between process liners T10 and T50 as described in Example 1. Activated samples were exposed to UVC irradiation using a FUSION UV DRS conveyor system. When the sample was exposed to UVC irradiation to activate cleavage of the crosslinked network, the modulus of the sample dropped significantly. However, the modulus did not drop below the Dahlquist Criterion ($3 \times 10^5$ Pa). Thus, this material was not a pressure sensitive material even upon network cleavage. Furthermore, upon UV irradiation, the degree of elongation of the material (i.e. strain at break) significantly increased.

TABLE 17

Tg and Tensile Properties Before and After Activation

| Sample | UV Dose, UVC | Tg (° C.) | G' (Pa) at 25 C. and 1 Hz | Peak Force at Break (g) | Strain at Break (%) |
|---|---|---|---|---|---|
| EX19 | Initial | 14.7 | 942,500 | 1054 | 120.3 |
| EX19 | Activated 100 mJ/cm² | 6.5 | 345,230 | 389 | 254.9 |

What is claimed is:

1. A composition comprising
   a polymer comprising polymerized units derived from
      a cleavable crosslinking monomer, the cleavable crosslinking monomer comprising at least two free-radically polymerizable groups and at least one group having the formula —O—C(R$_2$)(R$_3$)—O—, wherein R$_2$ and R$_3$ are independently hydrogen, alkyl, or aryl; and
      polymerized units derived from alkyl (meth)acrylate monomers having a Tg no greater than 10° C.;
   and the composition has a Tg no greater than 50° C.

2. The composition of claim 1 wherein the polymer comprises polymerized units derived from one or more non-cyclic alkyl (meth)acrylate monomer(s) having 4 to 20 carbon atoms.

3. The composition of claim 1 wherein the composition has a storage modulus greater than 3×10$^5$ Pa at 25° C. and 1 Hz.

4. The composition of claim 1 wherein the composition is a pressure sensitive adhesive.

5. The composition of claim 4 wherein the composition has a wet out of less than 5 seconds/in².

6. The composition of claim 1 wherein upon cleavage of at least a portion of the polymerized monomeric units derived from the cleavable crosslinking monomer, the composition exhibits a change in at least one physical property selected from
   a) a decrease in polymer gel content of at least 10%;
   b) a decrease in storage modulus of at least 10%; and
   c) an increase in peel adhesion of at least 10%.

7. The composition of claim 1 wherein the polymer comprises at least 50 wt. % of polymerized units derived from one or more alkyl (meth)acrylate monomer(s) having 4 to 20 carbon atoms.

8. The composition of claim 1 wherein the composition comprises tackifer, plasticizer, or a combination thereof.

9. The composition of claim 1 wherein the composition comprises 0.1 to 20 wt. % of the cleavable crosslinking monomer.

10. The composition of claim 1 wherein the cleavable crosslinking monomer has the formula:

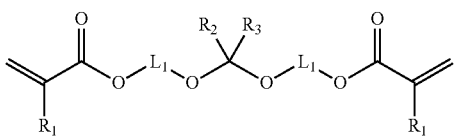

R$_1$ is hydrogen or methyl;
R$_2$ and R$_3$ are independently hydrogen, alkyl, or aryl; and
L$_1$ is a divalent linking group.

11. The composition of claim 1 wherein the cleavable crosslinking monomer has the formula:

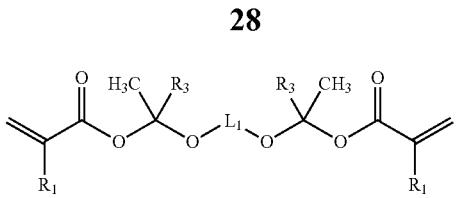

R$_1$ is hydrogen or methyl;
R$_3$ is independently hydrogen, alkyl, or aryl; and
L$_1$ is a divalent linking group.

12. The composition of claim 1 wherein the polymer comprises polymerized units derived from octyl (meth)acrylate.

13. The composition of claim 1 wherein the polymer further comprises polymerized units derived from at least one monomer selected from acid-functional monomers, non-acid functional polar monomers, vinyl monomers, and combinations thereof.

14. The composition of claim 1 wherein the polymer further comprises a non-cleavable crosslinker.

15. The composition of claim 1 wherein the composition further comprises a photoacid generator or thermal acid generator.

16. An article comprising the composition of claim 1 on a substrate.

17. A method of making an article comprising providing a composition according to claim 1 disposed on a substrate;
   exposing the composition to heat and/or radiation to cleave at least a portion of polymerized units derived from the cleavable crosslinking monomer.

18. A composition comprising
   a polymer comprising polymerized units derived from
      a cleavable crosslinking monomer, the cleavable crosslinking monomer comprising at least two free-radically polymerizable groups and at least one group having the formula —O—C(R$_2$)(R$_3$)—O—, wherein R$_2$ and R$_3$ are independently hydrogen, alkyl, or aryl; and at least 50 wt. % of polymerized units derived from one or more alkyl (meth)acrylate monomer(s) having 4 to 20 carbon atoms;
   and the composition has a Tg no greater than 50° C.

19. The composition of claim 18 wherein the composition has a storage modulus greater than 3×10$^5$ Pa at 25° C. and 1 Hz.

20. The composition of claim 18 wherein the composition is a pressure sensitive adhesive.

21. The composition of claim 18 wherein upon cleavage of at least a portion of the polymerized monomeric units derived from the cleavable crosslinking monomer, the composition exhibits a change in at least one physical property selected from
   a) a decrease in polymer gel content of at least 10%;
   b) a decrease in storage modulus of at least 10%; and
   c) an increase in peel adhesion of at least 10%.

22. The composition of claim 18 wherein the composition comprises tackifer, plasticizer, or a combination thereof.

23. The composition of claim 18 wherein the composition comprises 0.1 to 20 wt. % of the cleavable crosslinking monomer.

24. The composition of claim 18 wherein the cleavable crosslinking monomer has the formula:

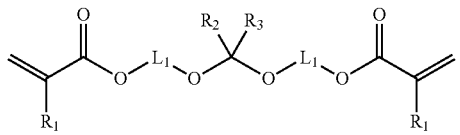

R₁ is hydrogen or methyl;
R₂ and R₃ are independently hydrogen, alkyl, or aryl; and
L₁ is a divalent linking group.

25. The composition of claim 18 wherein the cleavable crosslinking monomer has the formula:

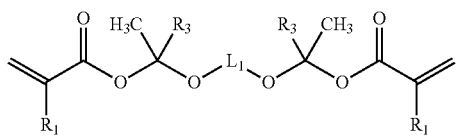

R₁ is hydrogen or methyl;
R₃ is independently hydrogen, alkyl, or aryl; and
L₁ is a divalent linking group.

26. The composition of claim 18 wherein the polymer comprises polymerized units derived from octyl (meth) acrylate.

27. The composition of claim 18 wherein the polymer further comprises polymerized units derived from at least one monomer selected from acid-functional monomers, non-acid functional polar monomers, vinyl monomers, and combinations thereof.

28. The composition of claim 18 wherein the polymer further comprises a non-cleavable crosslinker.

29. The composition of claim 18 wherein the composition further comprises a photoacid generator or thermal acid generator.

30. An article comprising the composition of claim 18 on a substrate.

31. A method of making an article comprising providing a composition according to claim 18 disposed on a substrate;
exposing the composition to heat and/or radiation to cleave at least a portion of polymerized units derived from the cleavable crosslinking monomer.

* * * * *

UNITED STATES PATENT AND TRADEMARK OFFICE
CERTIFICATE OF CORRECTION

PATENT NO. : 9,732,173 B2
APPLICATION NO. : 15/119887
DATED : August 15, 2017
INVENTOR(S) : Clapper et al.

It is certified that error appears in the above-identified patent and that said Letters Patent is hereby corrected as shown below:

In the Specification

Column 1
Line 43, Delete "–O-C($R^2$)($R^3$)-O-," and insert -- —O—C(R2)(R3)—O—, --, therefor.

Column 2
Line 4 (Approx.), Delete "pheny," and insert -- phenyl, --, therefor.

Column 3
Line 22 (Approx.), Delete "hydroxethyl" and insert -- hydroxyethyl --, therefor.

Column 4
Lines 10-11, Delete "isoctylalcohol," and insert -- isooctyl alcohol, --, therefor.

Column 6
Line 25, Delete "N-vinylpyrrolidinone." and insert -- N-vinylpyrrolidone. --, therefor.

Column 9

Lines 26-34 (Approx.), Delete " 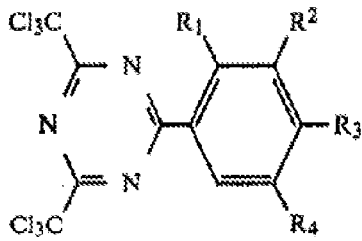 " and

Signed and Sealed this
Tenth Day of April, 2018

Andrei Iancu
*Director of the United States Patent and Trademark Office* insert -- 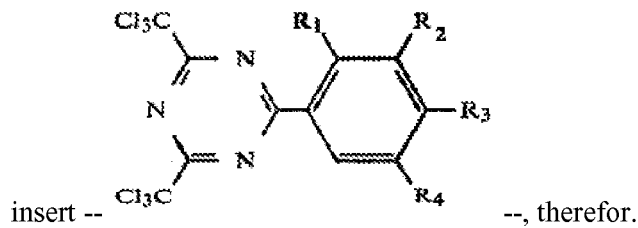 --, therefor.

Lines 40-41 (Approx.), Delete "2,4,-bis(trichloromethyl)" and insert -- 2,4-bis(trichloromethyl) --, therefor.

Column 10
Line 61, Delete "diphenylstilbino;" and insert -- diphenylstibino; --, therefor.
Lines 66-67, Delete "(diphenylsufonium)." and insert -- (diphenylsulfonium). --, therefor.

Column 11
Line 3, Delete "diarlyiodonium" and insert -- diaryliodonium --, therefor.

Column 16
Line 15, Delete ""Foral"" and insert -- "Floral" --, therefor.
Line 20, Delete ""Nevtack"," and insert -- "Nevtac", --, therefor.
Line 21, Delete ""Hikotac"" and insert -- "Hikotack" --, therefor.
Line 23, Delete "(Exxonmobile" and insert -- (Exxonmobil --, therefor.
Line 26, Delete ""Foral"" and insert -- "Floral" --, therefor.

Column 25
Line 20, Delete "*(Heraeus Noblelight Fusion UB Inc., Gaithersburg, Md.),*" and insert -- *(Heraeus Noblelight Fusion UV Inc., Gaithersburg, Md.),* --, therefor.

In the Claims

Column 27
Line 49 (Approx.), In Claim 8, delete "tackifer," and insert -- tackifier, --, therefor.

Column 28
Line 64, In Claim 22, delete "tackifer," and insert -- tackifier, --, therefor.